United States Patent
Shevy et al.

(10) Patent No.: US 7,006,550 B2
(45) Date of Patent: Feb. 28, 2006

(54) TRAVELING-WAVE LASERS WITH A LINEAR CAVITY

(75) Inventors: Yaakov Shevy, Altadena, CA (US); Roger G. M. P. Koumans, San Gabriel, CA (US); Dan Provenzano, Arcadia, CA (US); Drora Shevy, Altadena, CA (US); Reginald Lee, Pasadena, CA (US)

(73) Assignee: Orbits Lightwave, Inc., Pasadena, CA (US)

( * ) Notice: Subject to any disclaimer, the term of this patent is extended or adjusted under 35 U.S.C. 154(b) by 277 days.

(21) Appl. No.: 10/666,139

(22) Filed: Sep. 18, 2003

(65) Prior Publication Data
US 2004/0057471 A1 Mar. 25, 2004

Related U.S. Application Data

(60) Provisional application No. 60/411,856, filed on Sep. 18, 2002.

(51) Int. Cl.
*H01S 3/08* (2006.01)
*H01S 3/30* (2006.01)

(52) U.S. Cl. ............................................. 372/98; 372/6
(58) Field of Classification Search .................... 372/3, 372/6, 92–94, 98–99, 102, 106
See application file for complete search history.

(56) References Cited

U.S. PATENT DOCUMENTS

| | | | | |
|---|---|---|---|---|
| 5,448,579 A | * | 9/1995 | Chang et al. ................... 372/6 |
| 5,647,038 A | * | 7/1997 | Minden et al. ................ 385/37 |
| 5,991,068 A | * | 11/1999 | Massicott et al. ........... 359/337 |
| 6,259,552 B1 | * | 7/2001 | Boffi et al. .................. 359/332 |
| 6,421,170 B1 | * | 7/2002 | Krol et al. ................. 359/337.1 |
| 6,549,329 B1 | * | 4/2003 | Vail et al. .................... 359/334 |
| 6,768,750 B1 | * | 7/2004 | Kuksenkov ................... 372/20 |

* cited by examiner

*Primary Examiner*—Minsun Oh Harvey
*Assistant Examiner*—Phillip Nguyen
(74) *Attorney, Agent, or Firm*—Fish & Richardson P.C.

(57) ABSTRACT

A linear cavity design to produce a traveling wave operation as in a ring laser without the ring cavity design. All fiber configurations may be used to implement fiber lasers based on the linear cavity design.

43 Claims, 8 Drawing Sheets

TRAVELING-WAVE LASERS WITH A LINEAR CAVITY

This application claims the priority of U.S. Provisional Application No. 60/411,856 filed on Sep. 18, 2002, the entire disclosure of which is incorporated herein by reference as part of this application.

BACKGROUND

This application relates to lasers, and in particular, to single-mode lasers and fiber lasers.

Various applications may require the laser wavelength of a laser to be stabilized at a specific wavelength. In optical wavelength-division-multiplexed (WDM) systems, for example, the signal wavelengths of different optical WDM channels need to be maintained at designated WDM standard wavelengths according to a wavelength standard such as the WDM wavelengths established by the International Telecommunication Union (ITU). Other applications such as spectroscopic measurements may also use stabilized lasers to excite selected atomic or molecular transitions.

SUMMARY

This application includes an exemplary linear laser cavity design to provide a traveling wave operation that is usually achieved in a ring cavity, without having an actual ring cavity. Implementations of single-wavelength fiber lasers based on the cavity design, and techniques for tuning the laser wavelength of such lasers are also described. In one implementation, such a linear laser cavity may include a linear optical cavity having first and second polarization sensitive optical reflectors to reflect light at a laser wavelength and polarization state and to transmit light at a pump wavelength different from the laser wavelength. A laser gain section is provided in the linear optical cavity to produce optical gain at the laser wavelength by absorbing the pump light. Notably, first and second optical polarization rotating elements are in said linear optical cavity and are respectively located on two opposite sides of the laser gain section to make counter-propagating light beams at the laser wavelength to have orthogonal polarizations. An optical filter is also placed in the linear optical cavity to select a laser mode for light at the laser wavelength to transmit and being transparent to light at the pump wavelength.

Based on the above design, all-fiber devices may be constructed to have a linear fiber cavity. For example, a fiber device may include a first polarization-maintaining (PM) fiber section having a first fiber grating to reflect light at the laser wavelength with its polarization aligned along one principle axis of the PM fiber section and to transmit light at the pump wavelength different from the laser wavelength. A doped fiber gain section, e.g., using a single-mode fiber, is used to produce optical gain at the laser wavelength by absorbing the pump light. A quarter-wave plate is optically coupled between the first PM fiber section and a first side of the fiber gain section. A second PM fiber section is provided to have a second fiber grating to reflect light at the laser wavelength with polarization orthogonal to the first fiber grating and to transmit light at the pump wavelength. A three-quarter-wave plate is optically coupled between the second PM fiber section and a second side of the fiber gain section. In addition, an optical filter is optically coupled between the first and second fiber gratings to produce a peak transmission for light at the laser wavelength and being transparent to light at the pump wavelength. The doped fiber gain section may be made of a doped silica fiber or other doped fibers.

Fiber lasers based on this linear laser cavity design may be stabilized at a specified laser wavelength with a high side mode suppression ratio, narrow linewidth, shot noise limited AM noise and high polarization extinction ratio. Such fiber lasers can also be very efficient due to the elimination of spatial hole burning, may have a compact athermal package and may be manufactured at a low cost. In addition, such fiber lasers may be tunable in laser wavelength.

In one implementation, a device has a linear optical cavity and a laser gain section in the cavity. The linear optical cavity has first and second optical reflectors to reflect light at a laser wavelength and to transmit light at a pump wavelength different from the laser wavelength. The first reflector selectively reflects only light linearly polarized in a first direction and said second reflector selectively reflects light linearly polarized in a second direction. The laser gain section is used to produce optical gain at the laser wavelength by absorbing the pump light. This device also includes first and second optical polarization elements in the linear optical cavity and respectively located on two opposite sides of the laser gain section to make counter-propagating light beams at the laser wavelength reflected from said first and second optical reflectors to have orthogonal polarizations between the first and second optical polarization elements. In addition, an optical filter is located in the linear optical cavity between the first and second optical polarization elements to selectively transmit a single mode at the laser wavelength supported by the linear optical cavity.

In another implementation, a device includes a first polarization-maintaining (PM) fiber having a first fiber grating, a doped fiber gain section, a quarter-wave plate, a second PM fiber section having a second fiber grating, a three-quarter-wave plate, and an optical filter in the cavity formed by the first and second fiber gratings. The first PM fiber section has a first fiber grating to reflect light at a laser wavelength and to transmit light at a pump wavelength different from the laser wavelength the doped fiber gain section is used to produce optical gain at the laser wavelength by absorbing light at the pump wavelength from the first PM fiber section. The quarter-wave plate is optically coupled between the first PM fiber section and a first side of the doped fiber gain section and oriented to covert light from the first fiber grating into a first circularly polarized light. The second PM fiber section has a second fiber grating to reflect light at the laser wavelength and to transmit light at the pump wavelength. The three-quarter-wave plate is optically coupled between the second PM fiber section and a second side of the doped fiber gain section, and oriented to convert light from the second fiber grating into a second circularly polarized light orthogonal to the first circularly polarized light. The optical filter optically is used to produce a peak transmission for light at the laser wavelength and being transparent to light at the pump wavelength.

In yet another implementation, a fiber line is provided to have an input end which receives a pump beam at a pump wavelength and an output end which exports a residual of the pump beam and a laser beam at a laser wavelength shorter than the pump wavelength. The fiber line comprising a first fiber laser and a second fiber laser in series to share the same pump light in the fiber line. The first laser includes first and second fiber gratings spaced away from each other to form a linear fiber optical cavity and each configured to reflect light at the laser wavelength along a linear polarization direction and to transmit light at the pump wavelength. The first laser also includes a doped fiber gain section between the first and said second fiber gratings to absorb the pump beam and to produce and amplify the laser beam. A first fiber polarization element is coupled between said first fiber grating and said doped fiber gain section and configured to convert light reflected from said first fiber grating at the laser wavelength into a first circularly polarized light. A second fiber polarization element is coupled between said second fiber grating and said doped fiber gain section and to convert light at the laser wavelength reflected from said second fiber grating into a second circularly polarized light orthogonal to polarization of said fist circularly polarized light. In addition, an optical fiber bandpass filter is optically coupled between said first and said second fiber gratings. This optical fiber bandpass filter is transparent to the pump beam and selects a laser mode at the laser wavelength to transmit while rejecting other laser modes at the laser wavelength.

A method according to one implementation includes the following steps. A linear optical cavity is formed in a fiber strand with first and second fiber Bragg reflectors respectively formed n first and second polarization-maintaining fibers spaced from each other and a fiber gain section between the fiber Bragg reflectors. Each fiber Bragg reflector reflects light at a laser wavelength and to transmit light at a pump wavelength different from the laser wavelength. The fiber gain section absorbs light at the pump wavelength to produce an optical gain at the laser wavelength. An intra-cavity filter is provided in the linear optical cavity to select a single cavity mode to lase. The light polarization in the linear optical cavity is then controlled to make counter-propagating light beams at the laser wavelength to have orthogonal polarizations in at least the fiber gain section and to make said intra-cavity filter to transmit light reflected from said first and said second fiber Bragg reflectors.

These and other implementations and associated methods are described in greater detail with reference to the drawings, the detailed description, and the claims.

DETAILED DESCRIPTION

Figure 1:
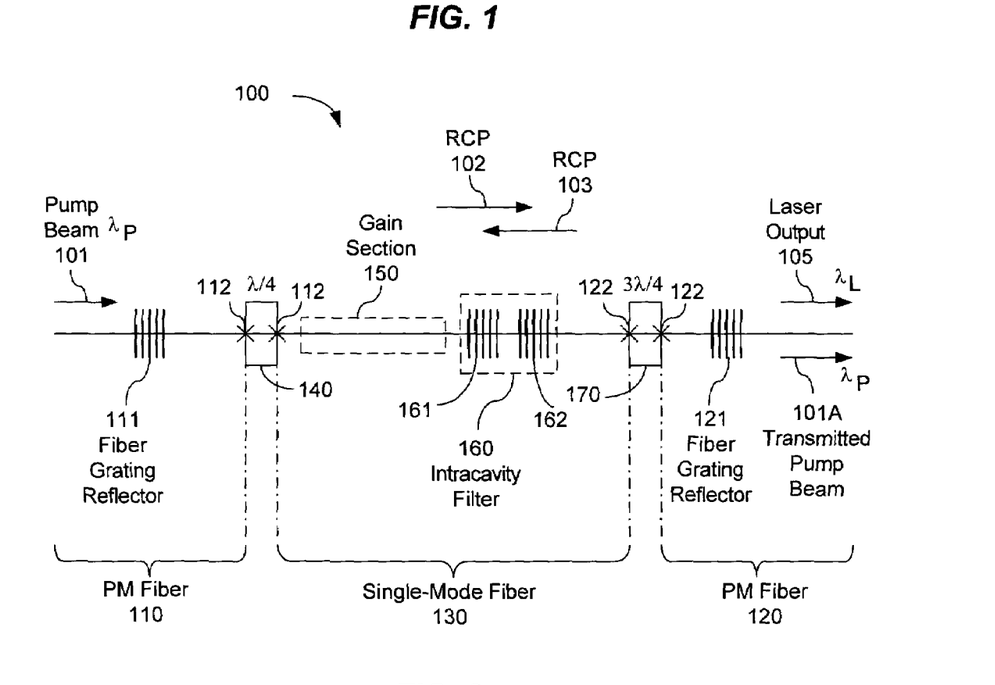
FIG. 1 shows one example of a linear laser cavity design to support a traveling wave operation as in a ring laser cavity, where the counter propagating beams 102 and 103 are either both right-hand circularly polarized (RCP) as labeled or light-hand circularly polarized (LCP).

FIG. 1 shows an exemplary laser 100 with a linear laser cavity designed to lase at a desired laser wavelength ($\lambda_L$). Two reflectors 111 and 121, such as fiber Bragg gratings, are positioned in an optical path and spaced from each other to form a Fabry-Perot laser cavity as the linear laser cavity where optical energy at the laser wavelength ($\lambda_L$) is reflected between them. The reflectors 111 and 121 are optically reflective at a band around the laser wavelength ($\lambda_L$) and are optically transmissive at other wavelengths. For example, either one or both reflectors 111 and 121 may be transmissive to light at a pump wavelength ($\lambda_P$) for optically pumping a laser gain medium in the optical path between the reflectors 111 and 121. One of the reflectors 111 and 121 may be partially transmissive to light at the band around the laser wavelength ($\lambda_L$), e.g., the reflector 121, to produce a laser output 105. The reflector 111 in this example may be completely reflective at the laser wavelength ($\lambda_L$). Alternatively, the pump-receiving reflector 111 may be partially transmissive and the reflector 121 may be completely reflective at the laser wavelength ($\lambda_L$) to produce the desired laser output.

In some implementations where transmitted pump beam is not needed, an additional reflector reflective to the pump wavelength may be formed in the laser 100 to reflect the pump light transmitted through the gain section back to the gain section to increase the pump efficiency and or to stabilize the pump wavelength. A pump-reflecting fiber Bragg grating may be used to achieve this. When the reflector 121 is a fiber Bragg grating in a strand of fiber, the pump reflecting fiber Bragg grating may be formed in the same fiber that is either spatially overlapped with the grating reflector 121 or separated from the grating reflector 121.

The laser 100 is designed in part to make the counter-propagating laser beams have orthogonal polarizations. In this regard, within the laser cavity, a polarization control mechanism is implemented to insure the proper orthogonal polarizations in counter-propagating beams. In the examples described here, two polarization elements are positioned at two opposite ends as this polarization control mechanism. In the example in FIG. 1, a quarter-wave plate 140 for light at the laser wavelength is placed at one end inside the laser cavity. A three-quarter-wave plate 170 for light at the laser wavelength is placed at the other end inside the laser cavity. A laser gain section 150 is placed in the optical path between the wave plates 140 and 170 to absorb a pump beam 101 and to produce an optical gain at the laser wavelength ($\lambda_L$). The positions of the waveplates 140 and 170 may be exchanged. As will be seen below, the waveplates 140 and 170 are placed within the laser cavity to at least eliminate formation of standing waves associated with the undesired spatial hole burning and to mitigate the composite cavity effects associated with insertion of an intra-cavity optical filter.

In order to mitigate the composite cavity effects, the first and second optical reflectors 111 and 121 may be sensitive to polarization in their operations and reflect laser light at the laser wavelength and operate in combination with the wave plates 140 and 170, respectively. In one implementation when the reflectors 111 and 121 are formed of the same material, reflectors 111 and 121 may be designed to reflect laser light with orthogonal polarizations. Hence, the first optical reflector 111 may reflect the laser light at a first polarization while the second optical reflector 121 may reflect the laser light of the same optical frequency at a second, orthogonal polarization.

The linear cavity formed by the reflectors 111 and 121 generally allows for multiple modes to lase. The laser 100 may operate in a single cavity mode. In this regards, an intra-cavity optical filter 160, such as a single mode Fabry-Perot filter or a comb filter, is placed between the laser gain medium 150 and the three-quarter-wave plate 170 to produce a narrow transmission at the laser wavelength to select only one of the laser modes to lase. In general, the filter 160 may be located in anywhere inside the cavity, e.g., in the gain section 150. The filter 160 may include two fiber Bragg grating reflectors 161 and 162 to reflect light at the laser wavelength at a band slightly larger than the bandwidth of the reflection bandwidth of 111 and 121 and transmit light at the laser mode frequency. In some implementations, the filter 160 may include more than two Bragg gratings to flatten the top of the transmission spectral response at the laser mode frequency. A flat top optical filter may be used as the filter 160 to mitigate any mismatch between the laser and the peak transmission of the filter 160.

The presence of this intra-cavity filter 160, however, may potentially create composite optical cavities in the laser 100. For example, the reflector 111 and the reflector 161 may effectuate one resonator for light that is reflected by the reflectors 111 and 160 (e.g., the side 161). Similarly, reflectors 160 (e.g., the side 162) and 121 may effectuate another optical resonator. Such multiple composite resonators are known to adversely affect the optical operations of the laser 100. In the illustrated example in FIG. 1, the cavity design uses the two waveplates 140 and 170 and the polarization-sensitive reflectors 111 and 121 to eliminate undesired effects of composite cavities that would otherwise be present due to composite cavities formed by the reflectors 111, 121 and grating reflectors in the filter 160 gratings. Such effects are undesirable because the matching of modes due to the composite cavities can be technically difficult. In addition, the intra-cavity light at the laser wavelength is circulating between the reflectors 111 and 121 to be amplified by the gain medium 150 without interfering with each other to form a standing wave in the laser gain medium 150. The two waveplates 140 and 170, when situated as shown in FIG. 1 or in an alternative configuration where their positions are exchanged, operate to make the polarization states of counter-propagating beams at the laser wavelength to be orthogonal between the reflectors 111 and 121. Hence, the interference between counter-propagating beams and the associated adverse spatial hole-burning problem may be eliminated. Therefore, this linear laser cavity allows for traveling wave operation similar to a ring laser without having a conventional ring cavity design.

The polarization-sensitive reflectors 111 121 may be designed to reflect linearly-polarized light in specified polarization directions, e.g., by using fiber grating reflectors in PM fibers. Under this design, the laser 100 in FIG. 1 uses the two wave plates 140 and 170 to transform the linearly-polarized light reflected from the polarization-sensitive reflectors 111 121 into circularly polarized light in the portion of the cavity between the wave plates 140 and 170 in a way to essentially eliminate both the spatial hole burning problem due to interference of counter-propagating laser beams and the composite cavities due to the presence of the intra-cavity filter 160.

As an example, assume the polarization sensitive reflector 111 reflects only the light at the laser wavelength that is linearly polarized along the x direction and the polarization sensitive reflector 121 reflects only the light at the laser wavelength that is linearly polarized along the orthogonal y direction. In addition, it is assumed that the wave plate 140 transforms the x-polarized light reflected from the reflector 111 into a right-hand circularly polarized (RCP) light 102 and the wave plate 170 transforms the y-polarized light reflected from the reflector 111 into a right-hand circularly polarized light 103. Because the beams 102 and 103 are in opposite directions, they are orthogonal to each other in polarization. Upon transmitting through the wave plate 140, this light becomes linearly polarized along the y direction. Because the reflector 111 only reflect light in the x polarization, the y-polarized light reflected from the filter 160 will transmit through the reflector 111 without being reflected. Hence, the reflector 111 and the filter 160 cannot form an optical resonator. Similarly, the reflector 121 and the filter 160 cannot form a resonator either. In addition, the counter propagating beams between the wave plates 140 and 170 are RCP beams that do not interfere to form a standing wave. Thus, the laser 100 does not have the spatial hole burning as in some other lasers with linear cavities.

The cavity design of the laser 100 may be implemented in various ways. As illustrated, one particular implementation of the laser 100 is an all-fiber design as a single-mode fiber laser. In the fiber implementation, fibers are used to form various components in the optical path of the laser 100. The reflectors 111, 161, 162, and 121, for example, may be fiber Bragg gratings formed within the respective fibers. The laser gain medium 150 may be a doped fiber section that has desired optical transitions within the gain spectral range for laser oscillation. Atomic transitions in rare-earth ions (e.g., Er, Yb, etc.) or other active ions, for example, may be used to produce lasers from visible wavelengths to far infrared wavelengths. Er-doped fiber amplifiers (EDFA) for producing optical signals at 1.55 microns are useful in optical fiber communication applications because the optical loss in the commonly used silica fibers is minimum at about 1.55 microns. In another implementation, the gain section 150 can also be a doped, non-silica fiber including doped fibers using phosphate, fluoride or bismuth as the host materials. Furthermore, the gain section 150 may also be a semiconductor optical amplifier. The waveplates 140 and 170 may also be formed by two polarization-maintaining fibers with their principal polarization axes properly oriented and with proper lengths. Different fibers used in the laser 100 may be spliced together so that the entire laser 100 is essentially one piece of fiber. Such a fiber laser can be designed to be light, compact, inexpensive to fabricate, and may provide highly stable single-mode single polarization laser operation with a narrow linewidth, high side mode suppression and signal to noise ratio. In addition, the laser 100, whether or not in the fiber implementation, may include a cavity control unit to tune the output laser wavelength.

The fiber laser 100 may be optically pumped by a pump beam 101 that is coupled into the laser cavity from one side, e.g., through the fiber-grating reflector 111 as illustrated. Alternatively, a side pumping configuration may be used to optically pump the gain section 150 from the side. A suitable pump wavelength ($\lambda_p$) is preferably at a wavelength outside the gain spectral range of the doped region 150 and is usually shorter than the laser wavelength ($\lambda_L$). For example, $Er^{+3}$, other rare earth ions, and other suitable ions can be doped in various host fiber materials such as, silica, fluoride, phosphate, and bismuth fibers to produce laser oscillations, e.g., at 1.55 microns when optically pumped at 980 nm or 1480 nm. A pump light source that produces the pump beam 101 may include a LED or a laser diode to produce pump light at one or more pump wavelengths in resonance with at least one optical transition in the doped fiber gain medium 150 for producing photons at the laser wavelength. Since fiber grating reflectors 111, 161, 162, and 121 may be reflective only at the laser wavelength that satisfies the Bragg phase matching condition and are transparent to light at other wavelengths, the remaining of the pump beam 101 at $\lambda_p$ that is not absorbed by the gain medium 150 transmits through the laser 100 as a transmitted pump beam 101A. This transmitted pump beam 101A may be used to amplify the laser output with the addition of a fiber gain section at the output by optically pumping the additional fiber gain section. The transmitted pump beam 101A may also be used to pump another fiber laser based on the same design so that the single pump beam 101 may be shared by two or more such fiber lasers optically connected in series. In certain implementations, the pump beam 101A may be reflected back into the fiber laser to increase its efficiency and or to stabilize the pump wavelength at an optimum value.

The fiber laser 100 may be generally divided into three parts based on the types of fibers used: an input polarization-maintaining (PM) fiber part 110 with the pump-receiving reflector 111, a single-mode fiber part 130 with the doped fiber gain section 150 and the fiber Fabry-Perot filter 160, and another PM fiber part 120 with the reflector 121. As illustrated, the waveplates 140 and 170 may be connected between the fiber sections 110 and 130, and between fiber sections 130 and 120, respectively, at the respective fiber connecting points 112 and 122. Alternatively, the waveplate 140 may be formed within the PM fiber 110 and the waveplate 170 may be formed within the PM fiber 120. The fiber grating reflector 111 may be formed in the PM fiber 110 by, e.g., imprinting with UV exposure. The fiber grating reflector 111 may be partially transmitting having a reflectivity of about or close to 100% at the laser wavelength. A short strand of PM fiber, e.g., about 1 mm with proper indices of refraction in the two orthogonal polarizations, may be spliced to the PM fiber 110 with the principal axis at 45 degrees with respect to the PM fiber axis in the fiber 110 to act as the quarter-wave plate 140 at the laser wavelength (e.g., at 1550 nm).

The gain medium 150 may include a few cm of single mode fiber highly doped with Er atoms or other rare earth species. This fiber segment is spliced to the PM fiber for the waveplate 140. Another section of single mode fiber with in-fiber resonator grating in a strand of Silica fiber is used to form a high finesse filter 160 with one side spliced to the fiber gain medium 150.

In one implementation of the three-quarter-wave plate 170, a section of PM fiber (e.g., about 3 mm) may be spliced at 45 degrees to the PM fiber 120 as the three-quarter-wave plate 170. In general, the two principal polarization axes of each of the waveplates 140 and 170 are aligned at 45 degrees with the two principal polarization axes of the adjacent PM fiber (110 or 120). The fiber grating 121 in the PM fiber 120 may have a reflectivity close to 80%, for example, to produce the laser output 105.

The wave plates 140 and 170 may be used to prevent the formation of optical cavities between gratings 111 and 121 with the gratings 161, 162 in the filter 160, respectively. As described above, the wave plates 140 and 170 can also eliminate the formation of a standing wave in the gain medium 150 and thus the spatial hole burning therein which would otherwise be present in such a linear cavity. Therefore, the optical gain in the gain medium 150 can be efficiently used to achieve high laser output power and a high signal to noise ratio.

Notably, the PM fiber gratings 111 and 121 are formed in PM fibers with optical birefringence and thus can create double reflection peaks due to the slightly different indices of refraction along the principal axes of each PM fiber. In one implementation such as when the PM fiber gratings 111 and 121 are made of the same PM fiber material, the high frequency peak of the fiber grating 111 can be aligned in frequency both with the low frequency peak of the fiber grating 121 and with the single transmission peak of the Fabry-Perot filter 160. Under this design, the fiber grating reflectors 111 and 121 are polarization-sensitive-reflectors where the reflector 111 reflects laser light at a selected laser wavelength with a polarization along a first polarization and the reflector 121 reflects laser light at the same selected laser wavelength with a second polarization perpendicular to the first polarization. When pumped by the pump light 101 at a desired pump wavelength, e.g., a 980 nm or 1480 nm, the fiber laser 100 can sustain a single mode laser operation at a frequency defined by the transmission peak of the filter 160, e.g., around 1550 nm. The laser output 105 is linearly polarized along the principal axis at the output PM fiber 120.

Figure 4:
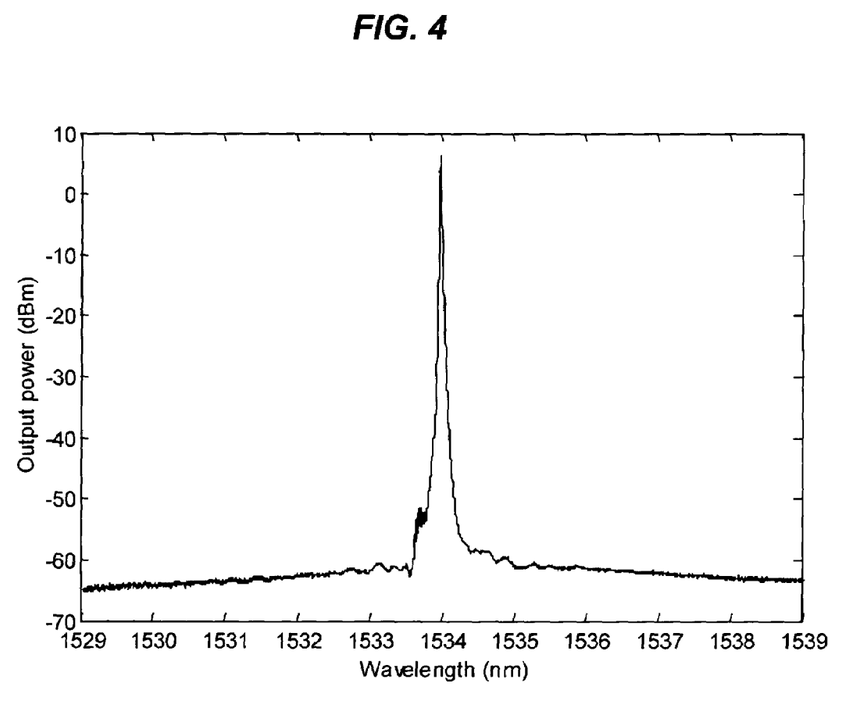
FIGS. 4 and 5 are measurements of a fiber laser based on the linear laser cavity design in FIG. 1.
Figure 5:
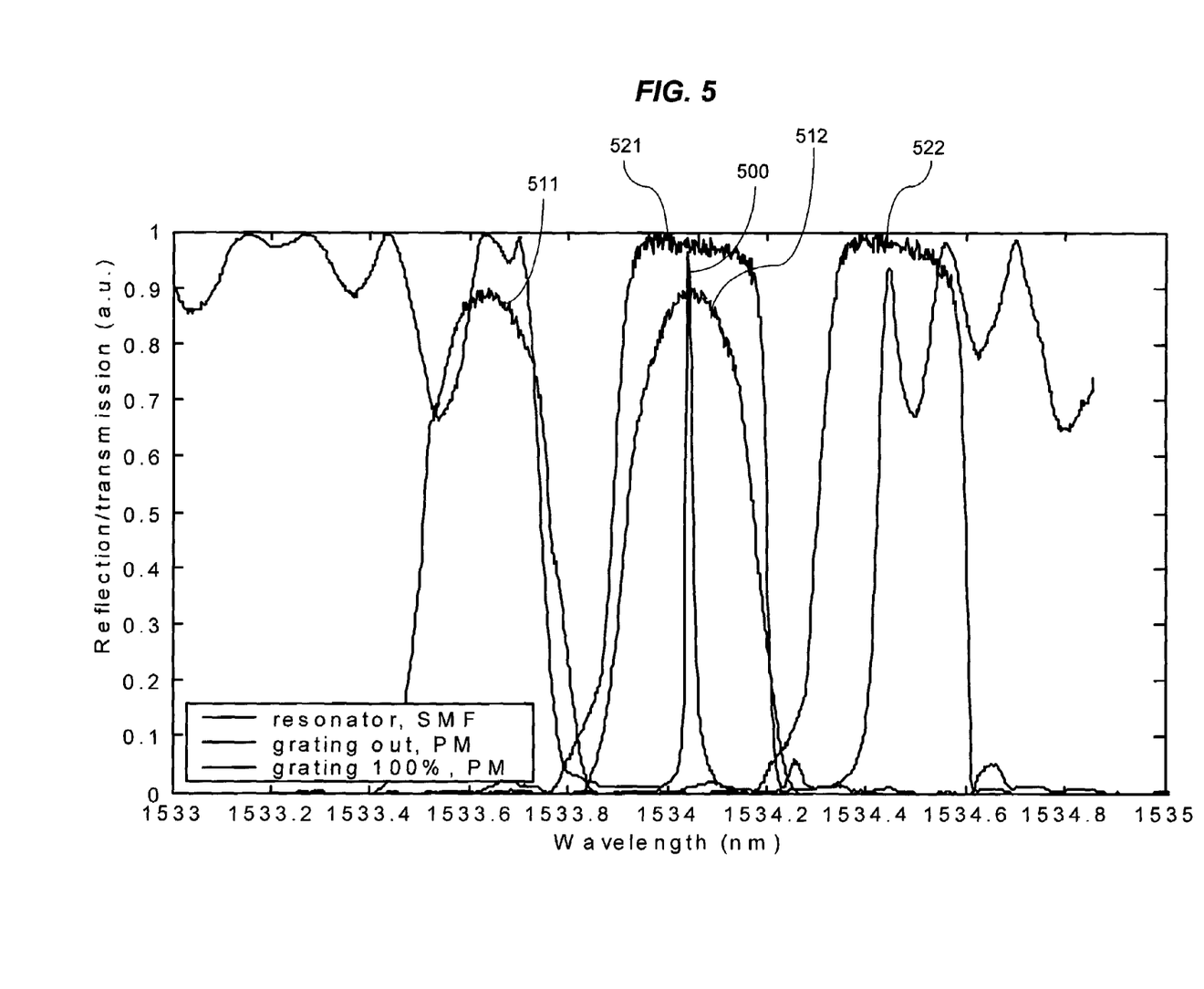

FIG. 4 shows a typical transmission peak of a laser mode in an exemplary fiber Fabry-Perot (FP) filter 160. FIG. 5 shows the relative alignment of different peaks of exemplary fiber grating reflectors 111, 121, and the filter 160 in the laser 100 that are represented by red, green, and blue traces, respectively. The transmission peak of the filter 160 is marked by a numeral 500. The reflection spectrum for the grating reflector 111 has peaks 521 and 522 for light of the same frequency with first and second orthogonal polarizations, respectively. Similarly, the reflection spectrum for the grating reflector 121 has peaks 511 and 512 for light of the same frequency with first and second orthogonal polarizations, respectively. The peak 512 for light in the second polarization of the grating reflector 121 overlaps with the peak 521 for light in the first polarization of the grating reflector 111. Hence, for light at this frequency, the grating 111 selects the light in the second polarization to reflect while the grating 121 selects the light at the first polarization to reflect. The transmission peak 500 of the filter 160 is set to overlap with both the peaks 512 and 521 to select a single mode for laser oscillation at this laser frequency that has the proper polarization states at the grating reflectors 111 and 121.

Hence, in the above fiber laser 100, the laser cavity selects light at the laser wavelength ($\lambda_L$) generated by the gain medium 150 to be amplified by their states of polarization. Detailed analysis shows that the circularly polarized light at the laser wavelength ($\lambda_L$) experiences the minimum loss in the laser cavity shown in FIG. 1 (with the associated components spectra detailed in FIG. 5) and hence only circularly polarized light at the laser wavelength ($\lambda_L$) will be selected by the cavity to amplify as the laser output. This selection by the laser cavity in FIG. 1 may be understood by the fact that each reflector 111 or 121 is selective in both wavelength and polarization due to the optical birefringence. Hence, the reflectivity of each reflector 111 or 121 is highest and the associated optical loss is minimum when the light incident from the intracavity region is linearly polarized along one principal polarization axis of the PM fiber and satisfies the Bragg condition of the fiber grating 111 or 121. With the above-described cavity configuration with the waveplates 140 and 170, a circularly polarized light between the waveplates 140 and 170, either right-handed or left-handed circularly polarized, meets such requirements. Hence, after the laser oscillation is established, the states of polarization in the laser 100 are as follows: the laser output is linearly polarized; the light between the waveplates 140 and 170 are circularly polarized; the counter-propagating waves in the laser 100 have mutually-orthogonal circular polarizations; and the intracavity laser light is linearly polarized between the reflector 111 and the waveplate 140, between the reflector 121 and the waveplate. Under this condition, there is no interference between counter-propagating waves. Therefore, distinctly different from other linear cavities, intracavity laser light circulates in the linear cavity in FIG. 1 between the reflectors 111 and 121 without requiring an actual optical ring. As a result, the laser 100 with a linear cavity operates like a ring laser.

The above relative alignment between the spectral reflection peaks of the PM fiber gratings 111 and 121 is to avoid the situation where the two reflection peaks from the grating reflector 111 simultaneously align with the two reflection peaks from the grating 121, respectively. This condition may not be necessary if (1) the filter 160 selects only one peak to transmit while rejecting the other peak; or (2) the PM fiber gratings 111 and 121 have different birefringent properties. Under the situation (2), when the PM fiber gratings 111 and 121 are birefringently different, the separation between the two reflection peaks for the orthogonal polarizations for the fiber grating reflector 111 can be different from that in the fiber grating reflector 121. Under this condition, as long as the grating reflectors 111 and 121 have only one common reflection peak, the composite cavity effects due to the presence of the filter 160 can be eliminated. Unlike the implementation illustrated in FIG. 5, the polarization for the grating reflector 111 and the polarization for the grating reflector 121 in the overlapped reflection peaks may be the same, i.e., along either x or y directions, or different with one along the x direction and the other along the y direction. However implemented, each of the polarization-sensitive reflectors 111 and 121 is designed to work with the corresponding wave plate (140 or 170) so that a reflected beam at the laser wavelength will not be reflected by the reflector.

The above fiber laser has a number of advantages. For example, the laser may be implemented in an all-fiber configuration where each component is made of a fiber component. The laser can operate in a single frequency mode the output laser frequency can be nearly independent on the pump power. As will be described below, the laser operating frequency can be stabilized at a desired frequency by thermal compensation, e.g., using a passive thermal compensation technique with negative thermal expansion packaging materials. The output polarization of the above laser can be well defined and aligned with the principal axis of the output coupling fiber. In addition, a narrow optical passband filter such as a Fabry-Perot filter or a composite filter may be used to narrowly define the laser frequency and stabilize the laser frequency at a desired laser frequency such as an ITU channel frequency. Furthermore, due to elimination of spatial hole burning, high side mode suppression and signal to noise ratio may be achieved in such lasers.

Figure 2:
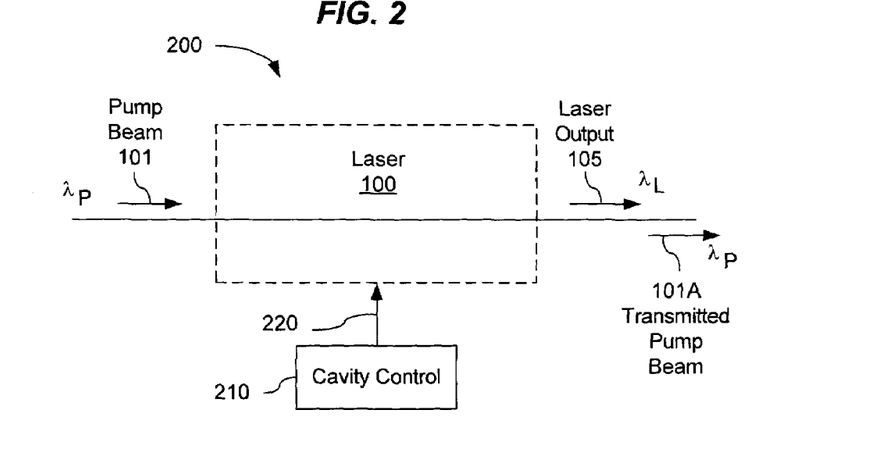
FIG. 2 shows one exemplary tunable laser based on the linear cavity design in FIG. 1.

In other implementations, the fiber laser 100 may be made tunable in the laser wavelength as shown by an example in FIG. 2. The tunable fiber laser 200 includes a fiber laser 100 and a cavity control unit 210. The unit 210 interacts with the laser cavity of the laser 100 via a stimulus 220 to adjust the laser frequency in the output 105. For example, the unit 210 may be a thermal control unit to control the temperature of the fiber cavity of the laser 100 where the optical path length of the cavity is tuned by changing the index of each fiber segment and the length of each fiber. For another example, the unit 210 may be a fiber stretcher or compressor which applies a force to change the optical length of the fiber cavity for tuning the laser wavelength.

Figure 3:
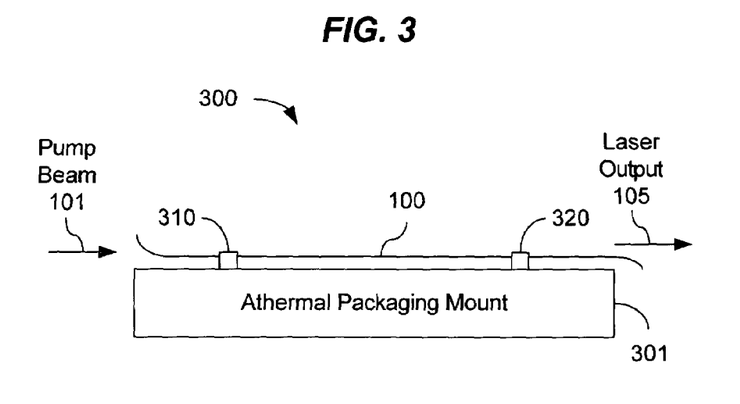
FIG. 3 shows an athermal packaging design for a fiber laser based on the linear cavity design in FIG. 1.

FIG. 3 further shows that the fiber laser 100 may be packaged in an athermal design to stabilize the laser cavity against a change in temperature without active thermal control. In this design, the fiber laser 100 may be mounted at two locations 310 and 320 to a temperature compensating mount 301 which has a negative thermal expansion coefficient so that the effects of the temperature variations in the fiber laser 100 and in the mount 301 compensate each other to reduce the overall effect on the laser cavity. The temperature compensating mount 301 may be a ceramic or other suitable materials. The fiber laser 100 may be mounted under a tension between locations 310 and 320. In case fibers of different composition and therefore different thermal properties appropriate materials with corresponding thermal expansion coefficients can be used to compensate different sections of the laser.

Figure 6A:
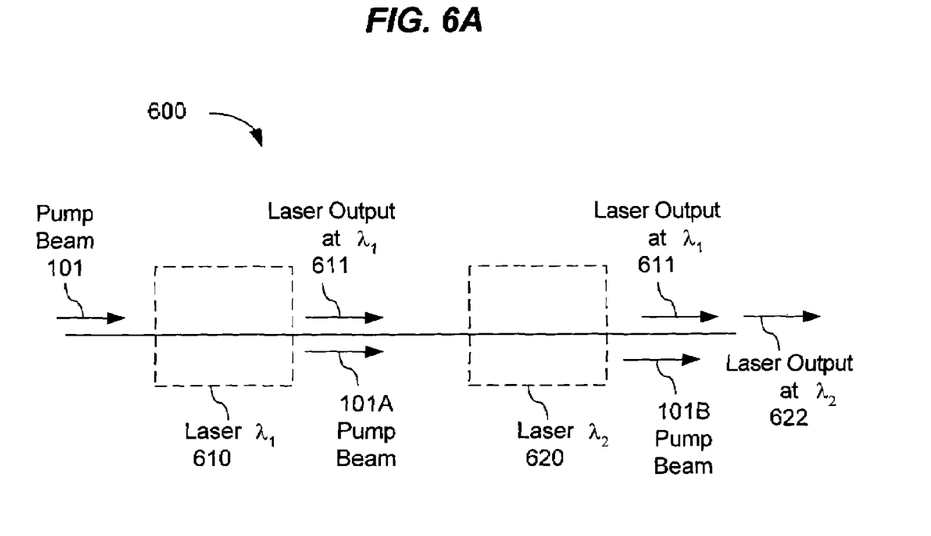
FIG. 6A shows an exemplary laser system that connects lasers in FIG. 1 in series to share the same optical pump.

FIG. 6A shows an exemplary cascaded fiber laser 600 where two or more fiber lasers 610 and 620 may be connected in series in a strand of fiber to share the same input optical pump beam 101. The two lasers 610 and 620 may operate at different laser wavelengths $\lambda 1$ and $\lambda 2$ so that the laser output 611 at $\lambda 1$ from the laser 610 may transmit through the laser 620 at $\lambda 2$. The transmitted pump 101A of the laser 610 becomes the input pump for the laser 620. The remaining transmitted pump beam 101B of the laser 620 may be used to pump yet another laser. Different lasers 610 and 620 may be respectively locked to different ITU WDM grids to produce WDM signals with a single pump beam 101.

Figure 6B:
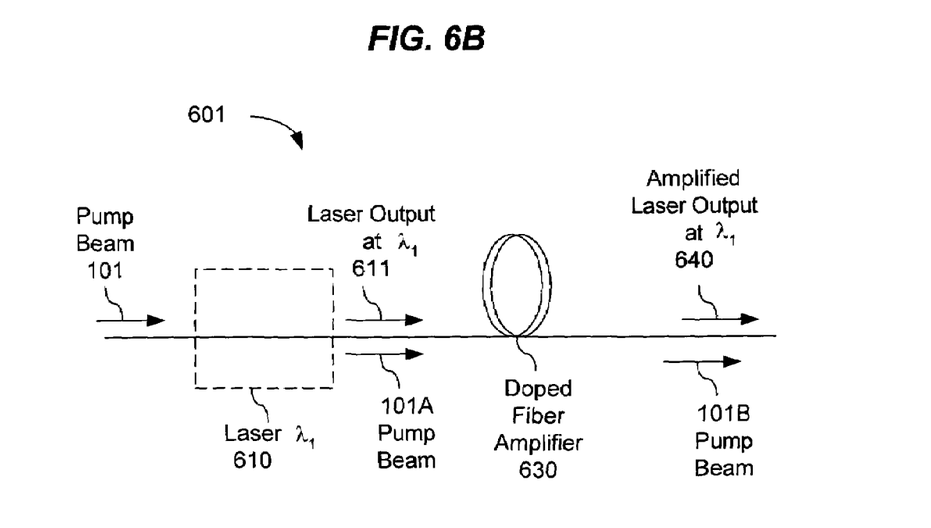
FIG. 6B shows an example of a fiber laser based on the design in FIG. 1 to include a downstream fiber amplifier that is optically pumped by the transmitted pump power from the fiber laser.

As another variation, FIG. 6B shows an extra strand of doped fiber amplifier 630 at the output of the laser 610 to optically amplifier the laser output 611 from the laser 610. An EDFA may be used as the amplifier 630 after the output grating 121 in the laser 100 in FIG. 1 in order to boost the output power. This additional EDFA is pumped by the pump beam 101A that transmits through the laser 610 as long as the input pump 101 is sufficiently strong. No additional optical pump is needed for the extra EDFA in this design.

Figure 7:
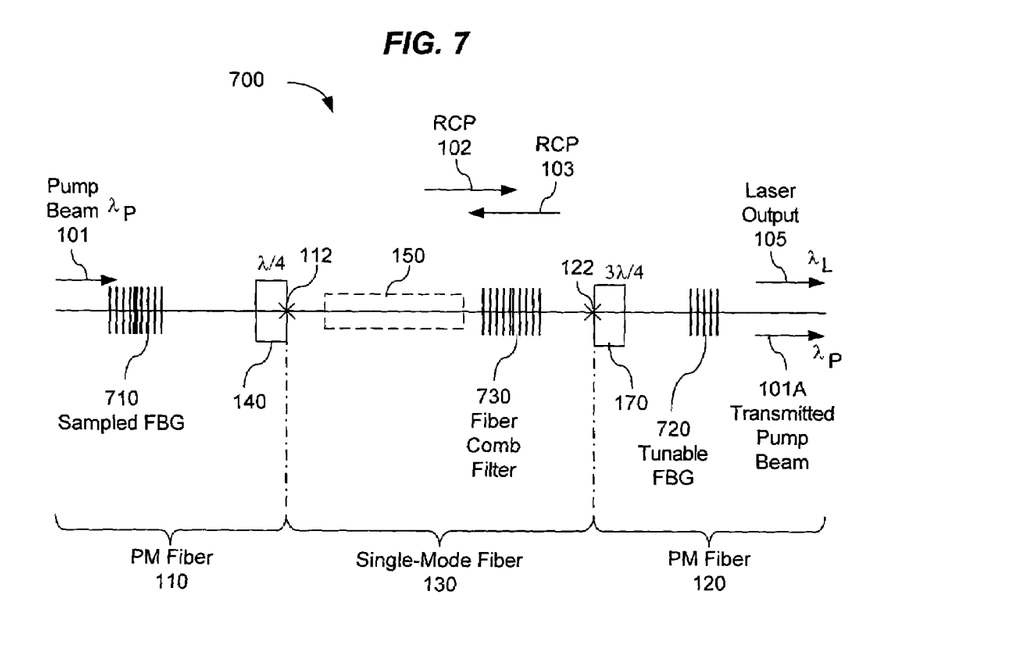
FIG. 7 shows another example of a traveling-wave fiber laser with a linear laser cavity.

FIG. 7 shows an alternative implementation 700 of a traveling-wave laser with a linear cavity for producing tunable laser output. In this implementation, the waveplates 140 and 170 are shown to be formed within the PM fibers 110 and 120 as described above in one implementation. Different from the laser 100 in FIG. 1, the reflectors 710 and 720 in laser 700 are a sampled fiber grating and a tunable fiber grating, respectively. The sampled fiber-grating reflector 710 produces a series evenly-spaced reflection bands respectively centered at the ITU WDM grid. The tunable fiber grating 720 is tunable to change its reflection band from one WDM channel to another so that the laser 700 is tuned to lase at different WDM wavelengths. Also different from the laser 100 in FIG. 1, instead of using a single Fabry-Perot filter formed from two fiber gratings, a fiber comb filter 730 is used to produce a series of narrow and separated transmission peaks on the WDM grids to select one WDM wavelength to lase at a time. The laser 700 is similar to the laser 100 in FIG. 1 in that the two or more lasers operating at different laser wavelengths based on the design in FIG. 7 may be cascaded to share the same pump laser as shown in FIG. 6A and in that a down stream fiber amplifier may be added at the laser output as shown in FIG. 6B to amplifier the laser output based on the optical pumping by the pump light transmitted through the laser.

Figure 8:
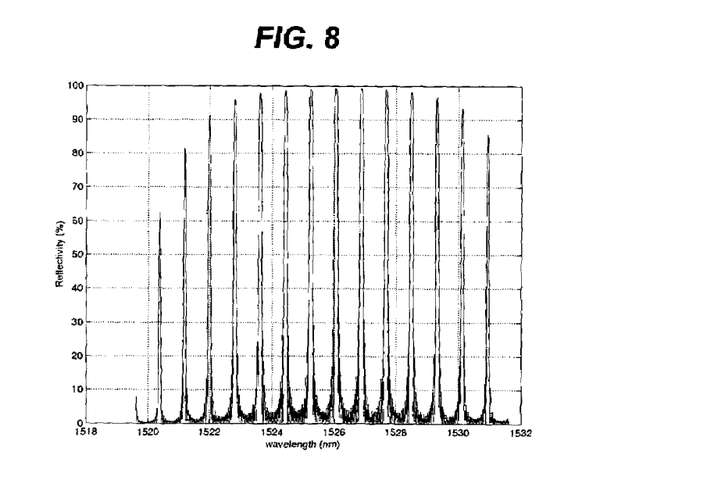
FIGS. 8, 9, and 10 show spectra of exemplary elements in the laser in FIG. 7.

In one implementation, the sampled fiber grating 710 is formed by having two spatially overlapping spatial patterns with different spatial periods in the PM fiber 110. The first spatial pattern in the fiber 110 in the sampled fiber grating 710 has a grating period less than that of the second spatial pattern and thus operates as the underlying Bragg reflection grating to produce a single Bragg reflection band. The second spatial pattern overlaps with the first spatial pattern such that final spatial pattern produced by the two overlapping spatial patterns is a multiplication of a first spatial modulation and a second special modulation. The coupling between the two spatial patterns produces a plurality of Bragg reflection bands at different wavelengths and with a bandwidth determined by the first spatial pattern, i.e., the signal Bragg reflection band is duplicated in the spectral domain at evenly spaced locations. For WDM applications, the second spatial pattern may be designed to place the Brag reflection bands at ITU WDM grids. FIG. 8 shows the Bragg reflection spectrum of one exemplary sampled grating reflector.

The comb filter 730 may be formed by various techniques. In one implementation, the comb filter 730 may be formed by two fiber gratings in the fiber where their spatial grating patterns are spatially shifted from each other. The amount of the spatial shift between the two grating patterns is selected to achieve a desired spectral separation of adjacent transmission peaks of the comb filter 730. For WDM applications, the transmission peaks respectively overlap with the ITU WDM grids or a fraction thereof.

Figure 9:
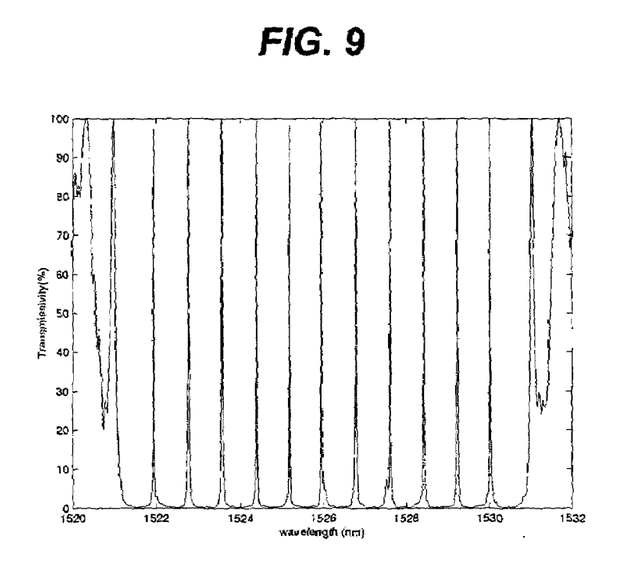

One simple implementation of the comb filter 730 is to have a broadband fiber Bragg grating separated by a small gap, which determines the free spectral range; such single pitch grating may not have wide enough bandwidth. Another implementation of such a comb filter with much wider spectral width is to have two chirped gratings separated by a gap, which will define the free spectral range of such distributed FP cavity. The two gratings may also partially overlap each other to extend the bandwidth of the comb. FIG. 9 shows the transmission spectrum generated by such a fiber grating comb filter formed of two chirped grating with a chirp rate of 1 nm/mm. The two gratings are written on top of each other with a 1 mm gap. This generates a comb filter with 100 GHz channel spacing anchored close to the ITU channels frequency.

Figure 10:
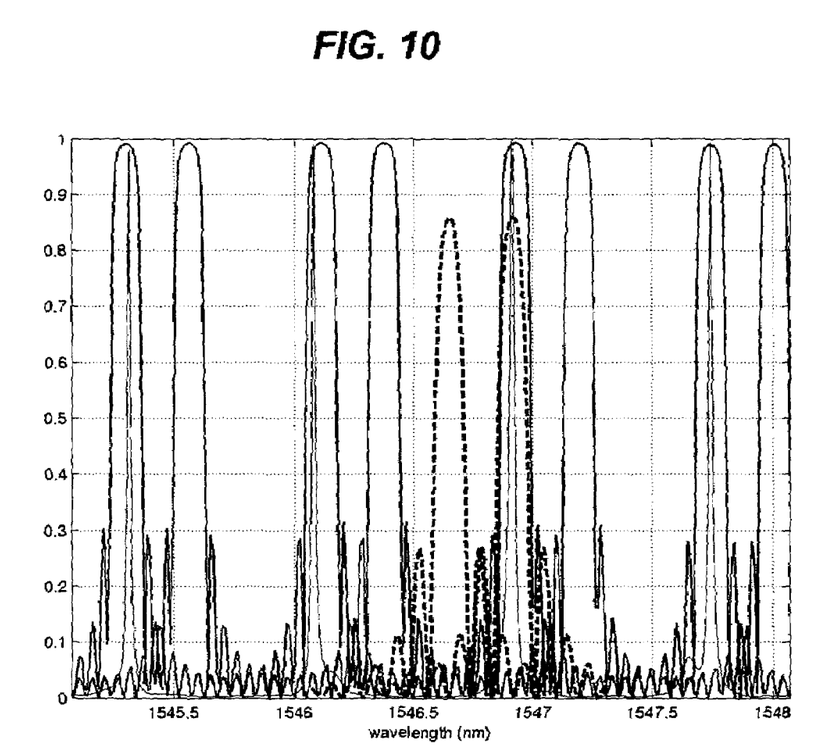

In operation, the tunable fiber grating reflector 720 may be tuned to have its Bragg reflection band aligned with a desired transmission peak of the comb filter 730 and one of the Bragg reflection band of the sampled grating reflector 710. Under this condition, the laser 700 selects the wavelength where the elements 710, 720, and 730 spectrally overlap to lase. FIG. 10 illustrates one example of such spectral overlap of the elements 710, 720, and 730 and shows the Comb filter transmission spectrum in red created by the distributed FP filter, the sampled reflector spectrum due to splitting in PM fiber in solid blue and green lines, and the reflection spectrum of the output tuning grating in dashed blue and green lines.

The tunability of the fiber-grating reflector 720 may be achieved in various ways. In one implementation, the temperature of the fiber-grating reflector 720 may be controlled to tune the spectral position of the Bragg reflection band and thus the laser wavelength of the laser 700. In another implementation, a fiber stretcher may be engaged to the fiber-grating reflector 720 to change the length of the fiber-grating reflector 730 by stretching or compressing for tuning the laser wavelength. In yet another implementation, the underlying fiber may be designed to exhibit electro-optic effect so that an external control electric field may be used to tune the fiber grating.

Notably, the tunable fiber-grating reflector 720 may include a single fiber grating or two or more fiber gratings that produce different Bragg reflection bands. The spectral tuning range of a single-grating reflector may be limited because the amount of change in the fiber length or the index of the fiber is limited. In the latter configuration with two or more fiber gratings, a wider tunable range may be achieved in comparison with a single-grating reflector because the Bragg reflection bands from different underlying gratings may be used.

The above linear cavity designs and the associated lasers may also be implemented with wave-guides formed on substrates such as planar waveguides, where each fiber Bragg grating is accordingly replaced with an equivalent grating structure formed in a respective waveguide section. Such wave-guides can be made from various waveguide materials.

Figure 11A:
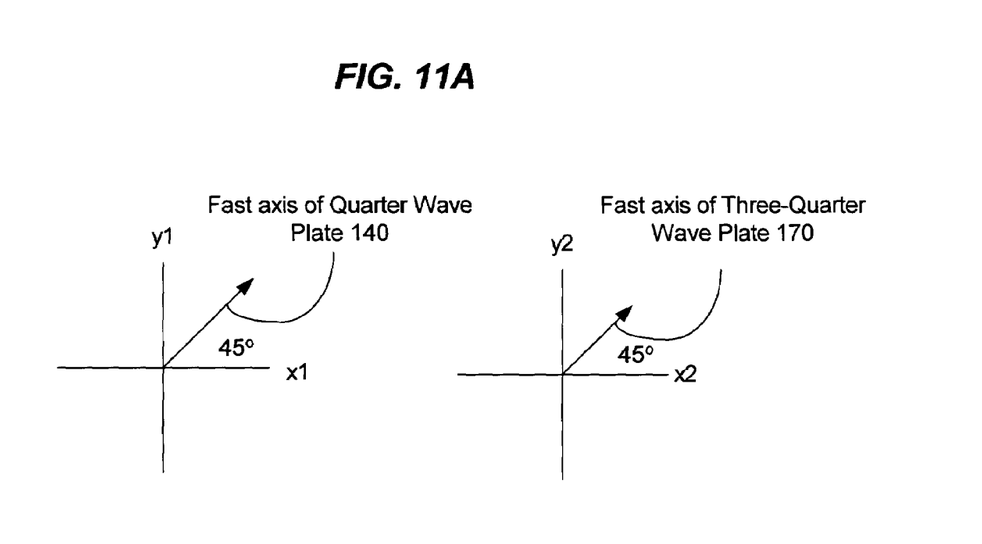
FIGS. 11A and 11B show orientations of a quarter wave plate and a three quarter wave plate that may be used in FIG. 1.
Figure 11B:
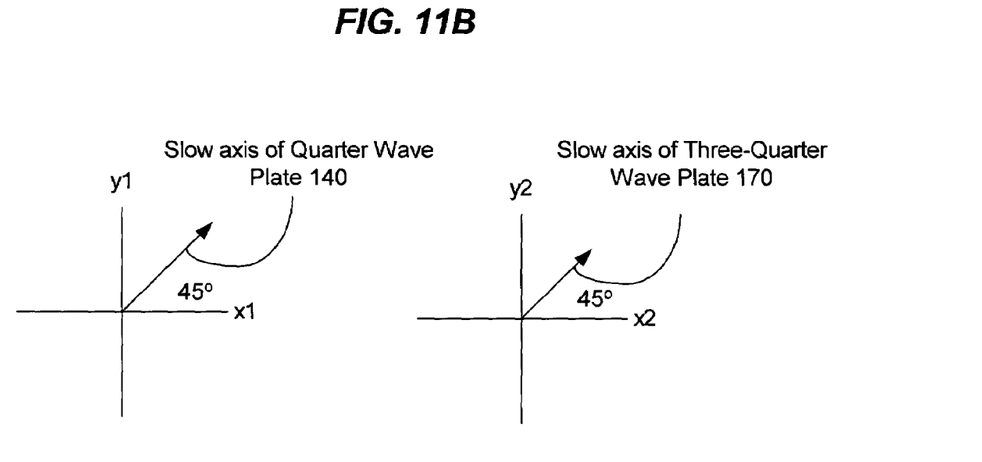

In general, the wave plates 140 and 170 are polarization rotating elements to rotate the polarization so that the counter-propagating laser beams between the wave plates 140 and 170 are orthogonal to each other in polarization. In the above examples, the quarter wave plate 140 and the three quarter wave plate 170 are used. FIG. 11A illustrates two exemplary relative orientations of the wave plates 140 and 170 based on the polarization directions of the reflectors 111 and 121. In each case, the wave plate 140 is oriented relative to the polarization direction of the polarization sensitive reflector 111 while the wave plate 170 is oriented relative to the polarization direction of the polarization sensitive reflector 121. Assuming the reflector 111 is polarized along the x1 direction and the reflector 121 is polarized along the x2 direction, the laser light reflected from the reflector 111 is linearly polarized along the x1 direction when incident to the quarter wave plate 140 and the laser light reflected from the reflector 121 is linearly polarized along the x1 direction when incident to the three quarter wave plate 170. The relative orientations of the polarization-sensitive reflectors 111 and 121 are not restricted here. Hence, in general, x1 may be at any angle with respect to x2. Accordingly, the relative orientations of the wave plates 140 and 170 are not restricted either. Under this configuration, the quarter wave plate 140 has one principal axis (e.g., the fast axis as in FIG. 11A) oriented at 45 degrees with respect to the x1 direction while the three quarter wave plate 170 has one principal axis (e.g., the fast axis as in FIG. 11A) oriented at 45 degrees with respect to the x2 direction. FIG. 11B shows an alternative relative orientation when both wave plates 140 and 170 are quarter wave plates.

Figure 12A:
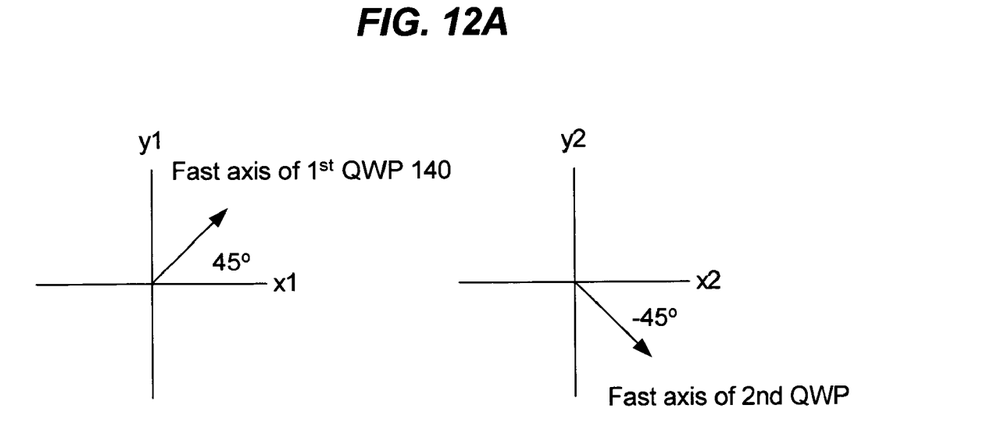
FIGS. 12A and 12B show orientations of two different quarter wave plates that may be used in FIG. 1.
Figure 12B:
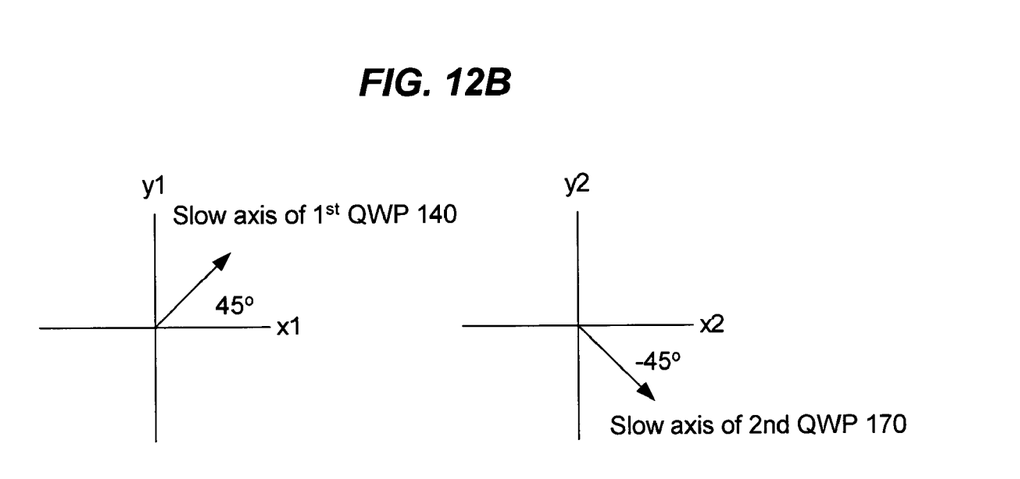

In another implementation, the three quarter wave plate 170 may be replaced by a second quarter wave plate to make the polarizations of counter-propagating laser beams between them orthogonal. FIGS. 12A and 12B show two relative orientations for this design. In FIG. 12A, the fast axis of the quarter wave plate 140 is at 45 degrees with respect to the x1 direction of the grating reflector 111 while the fast axis of the quarter wave plate 170 is at −45 degrees with respect to the x2 direction of the grating reflector 121. FIG. 12B shows another orientation configuration under this design. If x1 and x2 are parallel, the slow axis of the first quarter wave plate 120 is perpendicular to the slow axis of the second quarter wave plate that replaces the three quarter wave plate 170 in FIG. 1 and one of its principal axes, e.g., the slow axis, of the first quarter wave plate 120 forms 45 degrees with respect to the x direction.

Only a few implementations and examples are disclosed. However, it is understood that variations and enhancements may be made without departing from the spirit of and are intended to be encompassed by the following claims.

What is claimed is:

1. A device, comprising:

a linear optical cavity having first and second optical reflectors to reflect light at a laser wavelength and to transmit light at a pump wavelength different from the laser wavelength, wherein said first reflector selectively reflects only light linearly polarized in a first direction and said second reflector selectively reflects light linearly polarized in a second direction;

a laser gain section in said linear optical cavity to produce optical gain at the laser wavelength by absorbing the pump light;

first and second optical polarization elements in said linear optical cavity and respectively located on two opposite sides of said laser gain section to make counter-propagating light beams at the laser wavelength reflected from said first and second optical reflectors to have orthogonal polarizations between said first and second optical polarization elements; and an optical filter located in said linear optical cavity between said first and second optical polarization elements to selectively transmit a single mode at the laser wavelength supported by said linear optical cavity.

2. The device as in claim 1, wherein said linear optical cavity is a linear fiber cavity, and wherein said laser gain section is a doped fiber segment, and wherein said first and said second reflectors are fiber Bragg gratings.

3. The device as in claim 2, wherein said fiber Bragg gratings are reflective to light at the laser wavelength and are transmissive to light at the pump wavelength.

4. The device as in claim 1, further comprising a pump reflecting fiber Bragg grating positioned to reflect light at the pump wavelength transmitting through said laser gain section back to said laser gain section.

5. The device as in claim 1, wherein said first polarization element is a quarter-wave plate and said second polarization element is a three-quarter-wave plate.

6. The device as in claim 5, wherein said quarter-wave plate is oriented to have a principal axis at a 45 degree with respect to said first direction, and wherein said three quarter wave plate is oriented to have a corresponding principal axis at 45 degrees with respect to said second direction.

7. The device as in claim 1, wherein each of said first and said second polarization elements is a quarter-wave plate.

8. The device as in claim 7, wherein said first polarization element is oriented to have a principal axis at a 45 degree with respect to one said first direction, and wherein a corresponding principal axis of said second polarization element is at −45 degrees with respect said second direction.

9. The device as in claim 1, wherein said optical filter is a Fabry-Perot filter.

10. The device as in claim 1, wherein said optical filter includes two fiber Bragg gratings in a fiber.

11. The device as in claim 1, wherein said optical filter is optical bandpass filter with a flat spectral top transmission response.

12. The device as in claim 11, wherein said optical filter includes more than two Bragg gratings in a fiber.

13. The device as in claim 1, further comprising a laser control mechanism engaged to said linear optical cavity to adjust an optical path length of said linear optical cavity in response to a control signal and to tune a wavelength of laser output from said linear optical cavity.

14. The device as in claim 1, wherein the first direction of said first optical reflector is orthogonal to the second direction of said second optical reflector.

15. The device as in claim 1, wherein the first direction of said first optical reflector is parallel to the second direction of said second optical reflector.

16. A device, comprising:

a first polarization-maintaining (PM) fiber section having a first fiber grating to reflect light at a laser wavelength and to transmit light at a pump wavelength different from the laser wavelength;

a doped fiber gain section to produce optical gain at the laser wavelength by absorbing light at the pump wavelength from said first PM fiber section;

a quarter-wave plate optically coupled between said first PM fiber section and a first side of said doped fiber gain section and oriented to covert light from said first fiber grating into a first circularly polarized light;

a second PM fiber section having a second fiber grating to reflect light at the laser wavelength and to transmit light at the pump wavelength;

a three-quarter-wave plate optically coupled between said second PM fiber section and a second side of said doped fiber gain section, and oriented to convert light from said second fiber grating into a second circularly polarized light orthogonal to said first circularly polarized light; and an optical filter optically coupled between said first and said second fiber gratings to produce a peak transmission for light at the laser wavelength and being transparent to light at the pump wavelength.

17. The device as in claim 16, wherein said first PM fiber section is polarized along a first polarization direction and said second PM fiber section is polarized along a second polarization direction orthogonal to said first polarization direction.

18. The device as in claim 16, wherein said first PM fiber section is polarized along a first polarization direction and said second PM fiber section is polarized along a second polarization direction parallel to said first polarization direction.

19. The device as in claim 16, wherein said first fiber grating is a sampled fiber grating to produce a plurality of reflection bands.

20. The device as in claim 19, wherein said optical filter is a comb filter having a plurality of transmission peaks to select one of the reflection bands to transmit.

21. The device as in claim 20, wherein said comb filter includes two fiber gratings in a fiber that are spatially shifted from one another.

22. The device as in claim 21, wherein said two fiber gratings are chirped gratings.

23. The device as in claim 16, wherein each of said quarter-wave and said three-quarter-wave plates comprises a PM fiber.

24. The device as in claim 16, wherein said first fiber grating is a tunable fiber grating.

25. The device as in claim 16, further comprising a temperature compensating mount to hold at least two different locations of said fiber sections to passively compensate for a change in said fiber sections due to a variation in temperature.

26. The device as in claim 25, wherein said temperature compensating mount has a negative thermal expansion coefficient.

27. The device as in claim 16, wherein said doped fiber gain section comprises a doped silica fiber.

28. The device as in claim 16, wherein said doped fiber gain section comprises a doped phosphate fiber.

29. The device as in claim 16, wherein said doped fiber gain section comprises a doped fluoride fiber.

30. The device as in claim 16, wherein said doped fiber gain section comprises a doped bismuth fiber.

31. The device as in claim 16, wherein said doped fiber gain section comprises a semiconductor optical amplifier.

32. A device, comprising a fiber line having an input end which receives a pump beam at a pump wavelength and an output end which exports a residual of the pump beam and a laser beam at a laser wavelength shorter than the pump wavelength, said fiber line comprising a first fiber laser which comprises:

first and second fiber gratings spaced away from each other to form a linear fiber optical cavity and each configured to reflect light at the laser wavelength along a linear polarization direction and to transmit light at the pump wavelength;

a doped fiber gain section between said first and said second fiber gratings to absorb the pump beam and to produce and amplify the laser beam;

a first fiber polarization element coupled between said first fiber grating and said doped fiber gain section and configured to convert light reflected from said first fiber grating at the laser wavelength into a first circularly polarized light;

a second fiber polarization element coupled between said second fiber grating and said doped fiber gain section and to convert light at the laser wavelength reflected from said second fiber grating into a second circularly polarized light orthogonal to polarization of said fist circularly polarized light; and an optical fiber bandpass filter optically coupled between said first and said second fiber gratings, said optical fiber bandpass filter configured to be transparent to the pump beam and to select a laser mode at the laser wavelength to transmit while rejecting other laser modes at the laser wavelength.

33. The device as in claim 32, wherein said fiber line further comprises a second fiber laser to receive output pump light at the pump wavelength from said first fiber laser and to convert part of received pump light into a second laser beam at a second laser wavelength different from the laser wavelength, wherein said second fiber laser transmits the laser beam from said first fiber laser and the fiber line outputs laser beams at both the laser wavelength and the second laser wavelength.

34. The device as in claim 33, wherein said second fiber laser comprises:

first and second fiber gratings spaced away from each other to form a linear fiber optical cavity and each configured to reflect light at the second laser wavelength and to transmit light at the pump wavelength and the laser wavelength;

a doped fiber gain section between said first and said second fiber gratings to absorb the pump beam and to produce and amplify the second laser beam at the second laser wavelength;

a first fiber polarization element coupled between said first fiber grating and said doped fiber gain section;

a second fiber polarization element coupled between said second fiber grating and said doped fiber gain section, wherein said first and said fiber polarization elements make counter-propagating beams at the second laser wavelength to have mutually orthogonal polarizations; and an optical fiber bandpass filter optically coupled between said first and said second fiber gratings, said optical fiber bandpass filter configured to be transparent to the pump beam and light at the laser wavelength and to select a laser mode at the second laser wavelength to transmit while rejecting other laser modes at the second laser wavelength.

35. The device as in claim 32, wherein each of said first fiber polarization and said second fiber polarization element is a quarter wave plate.

36. The device as in claim 32, wherein and said first fiber polarization element is a quarter wave plate and said second fiber polarization element is a three quarter wave plate.

37. The device as in claim 32, further comprising a pump reflecting fiber grating in said fiber line to reflect light at the pump wavelength that transmits through said doped fiber gain section back to said fiber gain section.

38. The device as in claim 32, further comprising a doped fiber amplifier in said fiber line to receive output pump light at the pump wavelength and the laser beam from said first fiber laser to amplify the laser beam.

39. A method, comprising:

forming a linear optical cavity in a fiber strand with first and second fiber Bragg reflectors respectively formed n first and second polarization-maintaining fibers spaced from each other and a fiber gain section between the fiber Bragg reflectors, wherein each fiber Bragg reflector reflects light at a laser wavelength and to transmit light at a pump wavelength different from the laser wavelength, and wherein the fiber gain section absorbs light at the pump wavelength to produce an optical gain at the laser wavelength;

providing an intra-cavity filter in the linear optical cavity to select a single cavity mode to lase; and controlling light polarization in the linear optical cavity to make counter-propagating light beams at the laser wavelength to have orthogonal polarizations in at least the fiber gain section and to make said intra-cavity filter to transmit light reflected from said first and said second fiber Bragg reflectors.

40. The method as in claim 39, wherein the control of the light polarization is achieved by using a quarter-wave plate between the first fiber Bragg reflector and the fiber gain section and a three-quarter-wave plate between the fiber gain section and the second fiber Bragg reflector.

41. The method as in claim 39, wherein the control of the light polarization is achieved by using a first quarter-wave plate between the first fiber Bragg reflector and the fiber gain section and a second quarter-wave plate between the fiber gain section and the second fiber Bragg reflector.

42. The method as in claim 39, further comprising:

forming a second linear optical cavity in the fiber strand to receive optical output from the linear optical cavity, wherein the second linear optical cavity is formed of third and fourth fiber Bragg reflectors spaced from each other and a second fiber gain section between the fiber Bragg reflectors, wherein each fiber Bragg reflector reflects light at a second laser wavelength and to transmit light at the pump wavelength and the laser wavelength, and wherein the second fiber gain section absorbs light at the pump wavelength to produce an optical gain at the second laser wavelength; and coupling a single pump beam at the pump wavelength into the first linear optical cavity to produce the laser beam at the laser wavelength while using a residual of the single pump beam to produce the laser beam at the second laser wavelength in the second linear optical cavity.

43. The method as in claim 39, further comprising forming an additional fiber gain section to receive laser light at the wavelength and residual pump light at the pump wavelength from the linear optical cavity to amplify the received laser light.

* * * * *